(12) United States Patent
Carbonini

(10) Patent No.: US 7,487,711 B2
(45) Date of Patent: Feb. 10, 2009

(54) STEAM AUTOMATIC DISPENSING APPARATUS FOR PREPARING HOT AND/OR FROTHED DRINKS

(75) Inventor: Carlo Carbonini, Villastanza Di Parabiago (IT)

(73) Assignee: Rancilio Macchine per Caffe' S.p.A., Milan (IT)

( * ) Notice: Subject to any disclaimer, the term of this patent is extended or adjusted under 35 U.S.C. 154(b) by 228 days.

(21) Appl. No.: 10/550,694

(22) PCT Filed: Apr. 5, 2004

(86) PCT No.: PCT/IB2004/001201

§ 371 (c)(1),
(2), (4) Date: May 23, 2006

(87) PCT Pub. No.: WO2004/089173

PCT Pub. Date: Oct. 21, 2004

(65) Prior Publication Data

US 2006/0272516 A1    Dec. 7, 2006

(30) Foreign Application Priority Data

Apr. 9, 2003   (IT) ................... TO2003A0271

(51) Int. Cl.
*A47J 31/00*    (2006.01)

(52) U.S. Cl. .............................. 99/281; 99/284; 99/293; 99/323; 99/453

(58) Field of Classification Search ........... 99/279–323, 99/495, 468, 483, 326–333, 275, 516, 452–455
See application file for complete search history.

(56) References Cited

U.S. PATENT DOCUMENTS

| 2,682,984 | A  | * | 7/1954  | Melikian et al. ............... 221/96 |
| 6,099,878 | A  | * | 8/2000  | Arksey ....................... 426/231 |
| 6,713,110 | B2 | * | 3/2004  | Imboden et al. ............. 426/511 |
| 6,758,130 | B2 | * | 7/2004  | Sargent et al. ................ 99/295 |
| 6,959,642 | B1 | * | 11/2005 | Landolt ....................... 99/455 |
| 7,258,062 | B2 | * | 8/2007  | Green ....................... 99/323.1 |

FOREIGN PATENT DOCUMENTS

FR    2 824 249        11/2002
WO    01/97668 A1      12/2001

* cited by examiner

*Primary Examiner*—Timothy F. Simone
(74) *Attorney, Agent, or Firm*—Bacon & Thomas, PLLC

(57) ABSTRACT

A steam automatic dispensing device for preparing hot and/or frothed drinks, includes a first duct (13) for introducing steam inside a drink; a second duct (15) for introducing air inside the drink; an electronic control unit (51) for controlling the introduction of steam and/or air through said first and second duct, the control unit being programmable to carry out a predetermined control cycle depending on the desired drink to be obtained and on the drink temperature.

11 Claims, 3 Drawing Sheets

STEAM AUTOMATIC DISPENSING APPARATUS FOR PREPARING HOT AND/OR FROTHED DRINKS

BACKGROUND OF THE INVENTION

A. Field

The present invention refers to a steam automatic dispensing device for preparing hot and/or frothed drinks.

B. Related Technology

Preferably, but not exclusively, the invention is employed as an accessory separated or integrated of the espresso coffee machine for bar, for producing frothed hot milk to be used for instance for preparing cappuccinos.

It is known that, for producing milk froth with espresso coffee machines, the operator uses a container within which he pours a certain amount of milk, inside which he introduced steam through a jet simultaneously shaking the container, so to generate a certain turbulence inside the milk and to add in the environment air needed for producing froth.

The qualities and the quantity of the produced froth depend on the way the milk is shaken and on the amount of steam introduced, and they are therefore linked to the sensibility and experience of each operator. It follows that such features, and then the ones of the cappuccino within which the frothed milk is used, vary from operator to operator and they can be completely unsatisfactory to the client even deemed to be excellent by the operator.

A solution to the problem of how making the quality of the obtained product independent from the operator is the subject of the international patent application WO 01/97668, in the name of the applicant. Such patent application discloses a device essentially consisting of a container within which milk to be heated and to be frothed can be poured, inside which are provided a first duct for introducing steam in milk and a second duct, joined to said first duct, for introducing in milk the air needed for producing froth. The duct for steam dispensing is provided with a radial opening for the exit of steam and the duct for air ends within an axial opening placed in front of said radial opening of the steam duct. This way, the steam dispensing from said radial opening produces a depression that in its turn causes the air suction through the corresponding duct, the steam effusion velocity generates a turbulence at the bottom of milk causing that it is heated and mixed with air and a milk-air-steam mixture is therefore produced directly inside milk, with consequent froth formation.

However effective, the device above illustrated proves to be not much versatile, because it always provides the production of a milk-air-steam mixture and it makes impossible, for instance, the production of hot milk without froth.

Other devices using steam for heating drinks or food are respectively described in the documents U.S. Pat. No. 6,099,878 and FR 2 824 249.

U.S. Pat. No. 6,099,878 discloses a fully automatic, milk inclusive espresso coffee machine which includes coffee bean grinding and brewing apparatus and a milk aeration system which pumps a selection of milk from an internal refrigerator through a choice of aeration processes to a steaming apparatus for heating and further conditioning the milk for joining the brewed coffee liquor. With each beverage production cycle all milk is hygienically either served or returned to its refrigerated reservoir. A process is disclosed which includes pumping milk, all in a refrigerated environment, selectively along a plurality of milk lines one of which may inject air for foaming the milk to a steam delivery line for heating and steaming it and delivering it to a beverage cup. After the desired amount of milk has been delivered, the steam flow continues momentarily to cleanse the line of residual milk. FR 2 824 249 discloses a device for heating food comprising a temperature measurement rod including an agitator section with steam outlets and temperature sensor. A handle is used for stirring. The steam generator feeds the outlets through a flexible tube connected to the rod. An electrical controller is wired to the sensor and steam generator and/or a display unit.

BRIEF SUMMARY OF THE INVENTION

It is the main object of the present invention to realise a device for heating and/or preparing froth of a liquid that allows to automatically obtain different kinds of drinks, such as for instance, hot milk, hot and frothed milk, infusions, etc.

Another object of the present invention is to realise a device for heating and/or preparing froth of a liquid having limited size, that can be easily used in association with a professional coffee machine.

A further object of the present invention is to realise a device for heating and/or preparing froth of a liquid that allows to control the temperature of the liquid to be heated.

These and other objects are achieved with the automatic device for heating and/or preparing froth of a liquid as claimed in the accompanying claims.

By following the teachings of WO 01/97668, the device according to the invention comprises a first duct to introduce steam and a second duct through which it is possible to introduce air inside a liquid to be heated in order to obtain the formation of froth.

Advantageously, according to the present invention, each of said ducts is connected to an electrovalve: the user can select the kind of wanted drink and, on the basis of said selection, a microprocessor controls the opening and the closing of said electrovalves, so to permit or prevent according to a preset cycle the introduction of air and steam in the drink.

Said microprocessor can be equipped with a storage within which a plurality of operating cycles are stored, corresponding to a plurality of drinks that can be prepared with said device. Each of said operating cycles provides a sequence of steps of preset duration of opening and closing of each valve.

Advantageously, the device according to the invention can further comprise a sensor for measuring the temperature, so to control the temperature of the liquid to be heated and/or frothed and, in case, to correct the parameters of the above-mentioned operating cycles in order to obtain a drink at the desired temperature.

DESCRIPTION OF THE DRAWINGS

A preferred embodiment of the invention will be now described in detail with particular reference to the attached drawings, supplied as non limiting example, in which.

DETAILED DESCRIPTION

Figure 1:
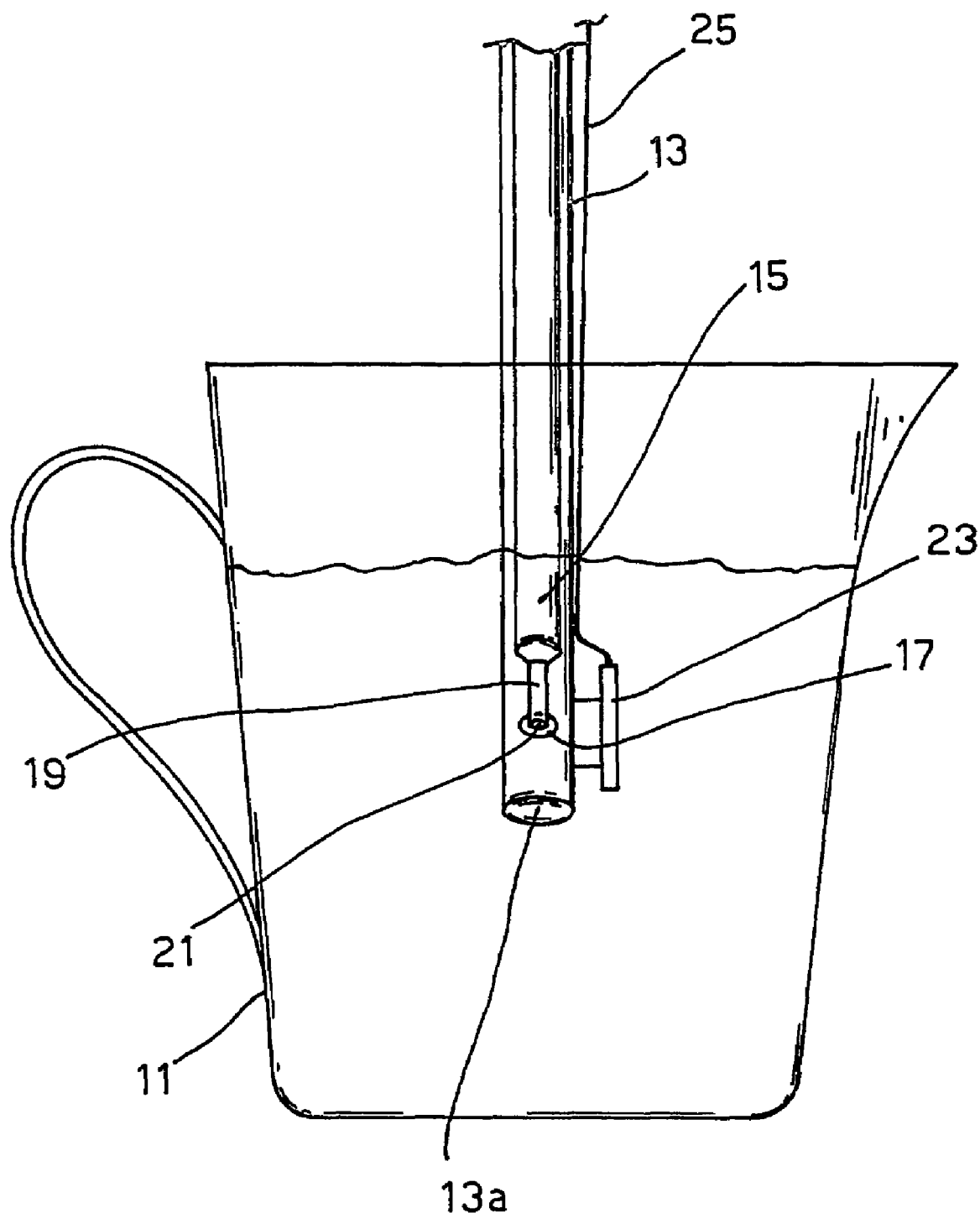
FIG. 1 is a schematic side view of the ducts dispensing steam and air of the device according to the invention.

With reference to FIG. 1, an embodiment of the device according to the invention is shown that comprises a first duct 13 for steam and a second duct 15 for air. In the example shown said ducts are immersed into the liquid, for instance milk, contained inside a container 11.

The steam duct 13 has the lower end 13a closed and it is provided, near said end, with a radial hole 17. The air duct 15, having a diameter smaller than one of the steam duct, has the end portion 19 tapered and it ends with an axial opening 21, placed in front of said radial hole 17 of said steam duct 13.

A temperature electronic sensor 23, fit for measuring the temperature of the liquid to be heated, is further fastened to one of said ducts 13, 15. Said sensor 23 is electronically connected to an electronic control unit through a couple of conductors passing inside a protective sheath 25.

Figure 2A:
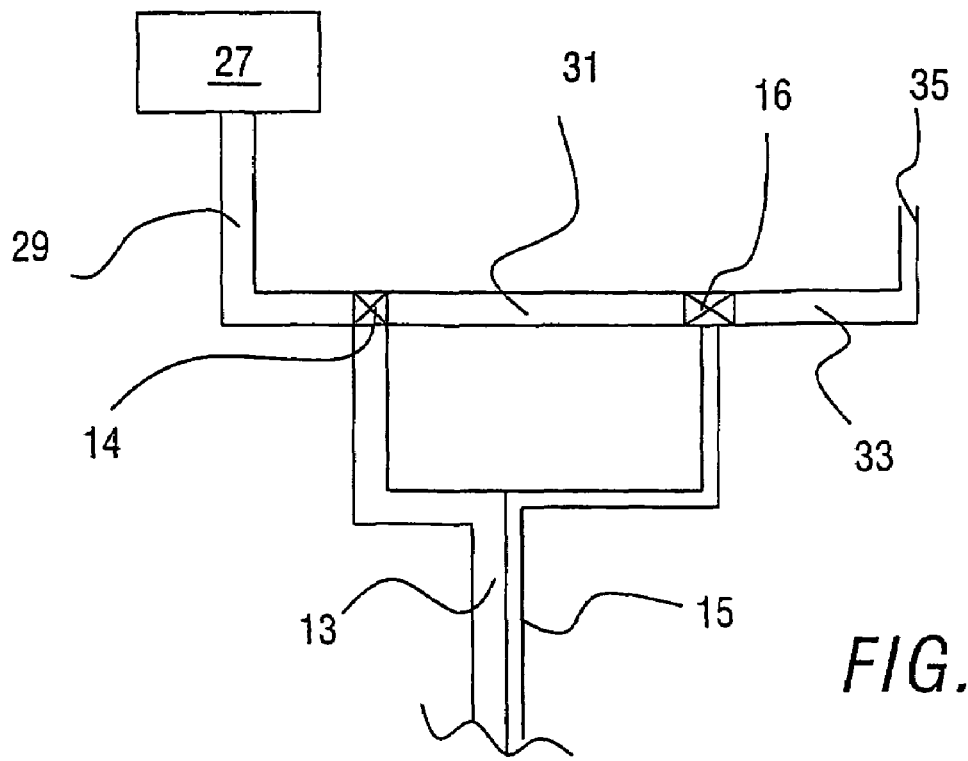
FIG. 2a is a scheme of a first embodiment of the device according to the invention.

In FIG. 2a a first embodiment of the hydraulic circuit of the device according to the invention is shown.

The air duct 15 is connected to the first way of a first three-way electrovalve 16, whose remaining two ways are connected respectively to the outside environment through a suction pipe 33 that has the end 35 open and to an intermediate pipe 31 that communicates with electrovalve 14 via a third way thereof.

The remaining second and first ways of said second electrovalve 14 are respectively connected to said steam duct 13 and to the steam source 27 through a steam supply pipe 29.

In such way, according to the opening or closing condition of said electrovalves 14, 16 one and/or the other of said ducts 13, 15 can be put in communication with said steam source 27 or duct 15 put in communication with air from the outside environment.

Specifically, thanks to the intermediate pipe 31 that connects the two electrovalves 14, 16, it is possible to introduce steam into the liquid to be heated through either said ducts 13, 15, or, alternatively, to introduce into said liquid steam only through duct 13 and air through duct 15.

Advantageously, thanks to the above-mentioned expedient it is possible to obtain drinks that require different preparation modes.

For instance, in case said second electrovalve 14 is positioned so to put in communication the steam dispensing pipe 29 both with the intermediate pipe 31 and with the steam duct 13 and said first electrovalve 16 is positioned so to put in communication the intermediate pipe 31 with the air duct 15 and to close said suction pipe 33, the steam generated from said steam source 27 will reach both the ducts 13, 15 and the liquid will be heated, substantially without froth formation.

In case, on the contrary, said first electrovalve 16 is positioned so to close the intermediate pipe 31 and to put in communication the suction pipe 33 with the air duct 15, the steam generated from said steam source 27 will only reach the steam duct 13, while the air duct 15 will be reached by the air sucked from the outside environment and it will be therefore obtained the froth formation during the liquid heating.

It is evident that, with the device according to the invention, it is possible to set numerous operating cycles based on the sequence of a plurality of steps, each characterised by a set duration and by a different condition of opening/closing of said electrovalves 14, 16, correspondingly obtaining numerous preparation modes of different drinks.

It is to be noted that, in a preferred embodiment, said steam source 27 consists of a steam jet of an espresso coffee machine for bar and, to this purpose, said pipe 29 can be equipped with means to be tight fastened to said steam jet.

Alternatively, the device according to the invention can be provided with an autonomous steam generator and it can therefore be used independently from other apparatuses for bar.

Figure 2B:
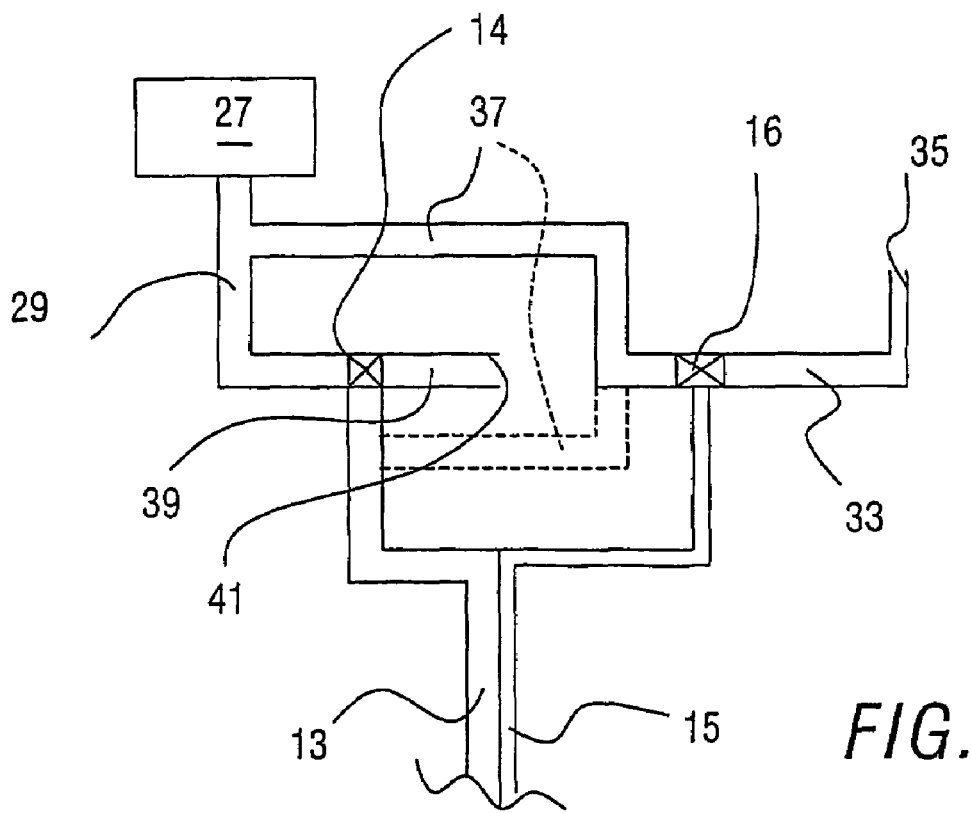
FIG. 2b is a scheme of a second embodiment of the device according to the invention.

With reference to FIG. 2b a second embodiment of the device according to the invention is shown. In said second embodiment the first three-way electrovalve 16, instead of being connected through the intermediate pipe 31 to the second three-way electrovalve 14, is directly connected through a pipe 37 to the pipe 29 carrying steam from the source 27 to the second electrovalve 14 (alternatively, pipe 37 could be connected to duct 13 immediately downstream the second electrovalve 14 as shown in FIG. 2b with the dotted line). In such way, the second three-way electrovalve 14 can be advantageously equipped with a pipe 39 open to the outside at 43 in order to allow the downwards easy flow by gravity of the liquid in case present in the duct 13 that, otherwise, should tend to clog, when said second valve 14 is positioned so to allow the passage from pipe 41 to duct 13.

It is to be noted that in the shown examples two three-way electrovalves have been employed for reasons of simplicity and economy, but it will be also possible to provide arrangements that employ a combination of other kinds of electrovalves and connections.

Figure 3:
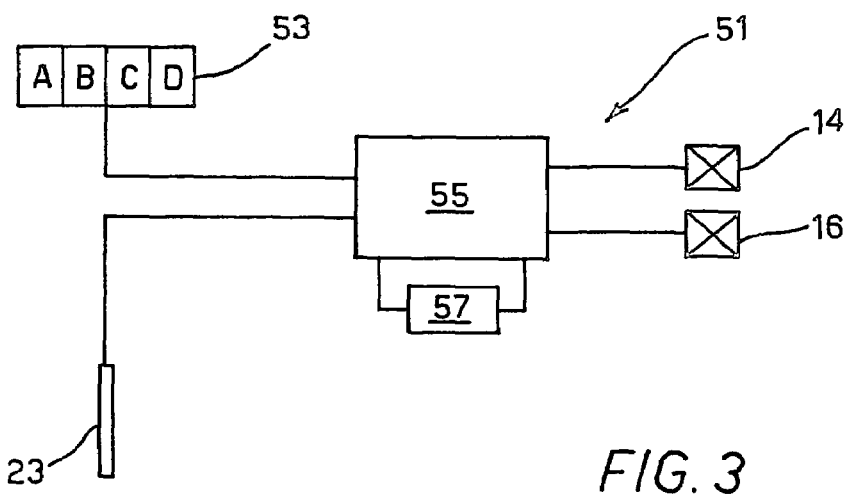
FIG. 3 is a block diagram of the electronic control unit of the device according to the invention.

FIG. 3 is a block diagram that illustrates in a simplified way the electronic control unit 51 of the device according to the invention.

Said control unit 51 comprises a selector 53 onto which the user can select the kind of wanted drink. The selection carried out onto the selector 53 controls a microprocessor 55, provided with a storage (memory) 57, within which the data relevant to the operating cycle corresponding to each possible user's selection are stored.

On the basis of the instructions stored inside the storage 57 said microprocessor 55 performs a cycle based on a sequence of opening and closing steps of each electrovalve 14, 16.

Said microprocessor 55 is further connected to the temperature sensor 23, if this is present. On the basis of the temperature-indicative signal sent by said sensor 23, the microprocessor 55 can modify the duration of the different steps of the opening and closing cycle of the electrovalves stored inside the storage 57 in order to obtain a drink with the optimum temperature and froth amount.

Figure 4:
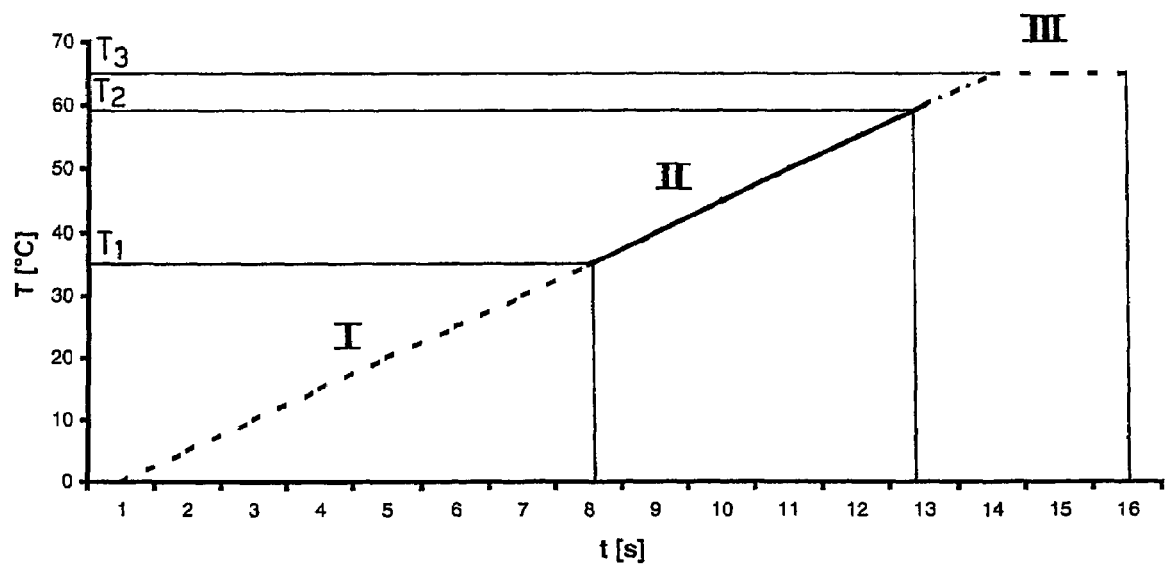
FIG. 4 is a graph showing the opening and closing steps of the valves in an example of preparing cycle of a drink.

As an example, in FIG. 4 is reproduced a graph that illustrates the operating cycle of the device according to the invention in case of preparing a cappuccino.

In said graph, on the axis of abscissae the time for preparing the drink is quoted and on the axis of ordinates the milk temperature is quoted.

During a first step I, shown with a dotted line in the graph, said first electrovalve 16 and said second electrovalve 14 are maintained in such a position to simultaneously send steam to both the ducts 13 and 15 and to prevent air entering through the suction pipe 35.

When milk reaches a preset temperature T1, for instance about 35° C. (or after a fixed time when the temperature control is not present), in a second step II, shown with a continuous line in the graph, the first electrovalve 16 is positioned so to allow the air entering through the duct 15 and to prevent steam passing from the intermediate pipe 31.

Said first electrovalve is maintained open up to a preset temperature T2 (or for a fixed time when the temperature control is not present), for instance of 5° C. under the final wanted temperature T3 (in the example 65° C.).

Once reached said temperature T2, in a third step III, shown with a dot-point line in the graph, said first electrovalve 16 is again positioned so to allow the steam entering also through duct 15 and to prevent air suction through the suction pipe 35.

This arrangement is maintained until the preset temperature T3 is reached, having reached which the second valve 14 is closed so to prevent steam introduction into both the ducts and to allow the removal of the drink.

Though in the preferred embodiment the ducts of the device according to the invention are directly connected to the steam jet of a professional espresso coffee machine, by following the teachings of WO 01/97668 it will be possible to provide a device comprising a container for the liquid to be heated, wherein said ducts are fastened to said container.

The invention claimed is:

1. A steam automatic dispensing device for preparing either or both hot and frothed drinks, comprising:
   a first duct (13) arranged to introduce steam from a steam source (27) into a drink within a container;
   a second duct (15) arranged to introduce air from an air source (35) or steam from a steam source into the drink;
   an electronic control unit configured to control the introduction of steam only through said first and second ducts (13,15), or steam alone through said first duct (13) and air alone through said second duct (15), said control unit including a microprocessor programmable to carry out a predetermined control cycle depending on a desired drink to be prepared;
   first and second three-way electrovalves (14, 16) arranged to control the introduction of steam through both said first and second ducts (13,15), while enabling or preventing introduction of air through said second duct (15), wherein the operation of said electrovalves is controlled by said electronic control unit;
   a third duct (33) arranged to receive air from a source of air (35);
   a fourth duct (29) arranged to receive steam from a steam source;
   a fifth duct (31,37) arranged to receive steam from a steam source;
   said second electrovalve providing communication between said third duct (35) and said second duct (15) in a first valve position to thereby enable air to be drawn into said second duct (15) in its first valve position, and providing communication between said fifth duct (31.37) and said second duct (15) in a second valve position, to thereby enable steam to be supplied through both said first and second ducts (13, 15) while air is excluded from being drawn into said second duct (15) when in its second valve position; and
   said first electrovalve providing communication between said fourth duct (29) and said first duct (13) in a first valve position, to thereby enable steam to be supplied to said first duct (13) in its first valve position.

2. The dispensing device according to claim 1, wherein first electrovalve (14) provides communication between said fourth duct (29) and both said first duct (13) and said fifth duct (31) in a second valve position, thereby enabling steam to be supplied to both said first and second ducts (13, 15) when said first electrovalve is in its second valve position and said first electrovalve (14) is in its second valve position.

3. The dispensing device according to claim 1, wherein said first electrovalve (14) provides communication between said fourth duct (29) and the outside environment in a second valve position.

4. The dispensing device according to claim 1, wherein said first duct (13) has a closed end adapted for immersion in a drink within a container and is provided with a radial hole (17) near said closed end.

5. The dispensing device according to claim 4, wherein said second duct (15) has an end adapted for immersion in a drink within a container, and said end of said second duct includes an axial opening (21) located in front of said radial hole of said first duct.

6. The dispensing device according to claim 1, wherein said microprocessor includes a memory containing instructions for opening and closing cycles of said electrovalves, said microprocessor arranged to selectively control opening and closing of said electrovalves in accordance with said instructions.

7. The dispensing device according to claim 6, wherein said memory contains instructions relevant to the carrying out of a plurality of opening and closing cycles of said electrovalves, and wherein said electronic control unit comprises a selector to select a desired cycle.

8. The dispensing device according to claim 7, including a temperature detecting electronic probe adapted for immersion in a drink in a container, said probe generating a temperature-indicative signal that is received and processed by said microprocessor to control selective opening and closing of said electrovalves.

9. The dispensing device according to claim 7, wherein one of said opening and closing cycles of said electrovalves results in the valve positions of said electrovalves (14, 16) being controlled during a first part of such cycle such that said first and second valves (14,16) are set respectively at their second valve positions, so that steam from a steam source is introduced simultaneously through both said first (13) and second (15) ducts and the introduction of air from an air source is prevented, and during a second part of the cycle said first and second valves (14,16) are set respectively at their first valve positions so that steam from a steam source is introduced through said first duct (13) and air from an air source may be drawn through said second duct (15), and during a third part of the cycle, said first and second valves (14,16) are set respectively at their second valve positions so that steam from a steam source is introduced simultaneously through both said first and second ducts (13,15) and the introduction of air from an air source is prevented.

10. The dispensing device according to claim 9, wherein said cycle parts are controllable by the microprocessor so as to each have a pre-set duration.

11. The dispensing device according to claim 8, wherein said cycle parts are controllable by the microprocessor so as to each have a pre-set duration, and further wherein the duration of said cycle parts is variable by said microprocessor in accordance with said temperature-indicative signal received from said temperature probe.

* * * * *